United States Patent [19]

Niessner et al.

[11] Patent Number: 5,410,537
[45] Date of Patent: Apr. 25, 1995

[54] COMMUNICATIONS INSTALLATION

[75] Inventors: Gerhard Niessner, Gröbenzell; Peter Seul, Feldafing, both of Germany

[73] Assignee: Siemens Aktiengesellschaft, Munich, Germany

[21] Appl. No.: 119,178

[22] PCT Filed: Sep. 19, 1992

[86] PCT No.: PCT/DE92/00216
§ 371 Date: Sep. 21, 1993
§ 102(e) Date: Sep. 21, 1993

[87] PCT Pub. No.: WO92/17037
PCT Pub. Date: Oct. 1, 1992

[30] Foreign Application Priority Data

Mar. 22, 1991 [DE] Germany .................. 41 09 534.0

[51] Int. Cl.⁶ ........................................... H04Q 5/18
[52] U.S. Cl. ................................. 370/16; 340/825.16

[58] Field of Search ............... 340/825.01, 825.06, 340/825.16; 370/16, 17, 58.2, 85.9, 85.11; 395/110.1, 220, 325

[56] References Cited

U.S. PATENT DOCUMENTS

| | | | |
|---|---|---|---|
| 4,136,333 | 1/1979 | Sumida et al. | 340/825.16 |
| 4,413,335 | 11/1983 | Clements et al. | 340/825.16 |
| 5,166,673 | 11/1992 | Herrmann et al. | 340/825.06 |
| 5,268,898 | 12/1993 | Kazato | 340/825.06 |

FOREIGN PATENT DOCUMENTS 0421583  4/1991  European Pat. Off. .
WO87/03763  6/1987  WIPO .

Primary Examiner—Bendict V. Safourek
Attorney, Agent, or Firm—Hill, Steadman & Simpson

[57] ABSTRACT

A number of peripheral controllers are connected to a PCM highway used exclusively for switching through signalling and packet data. Each controller has a counter indicating the usage factor. If the usage of one controller is too high, the next controller is activated.

3 Claims, 1 Drawing Sheet

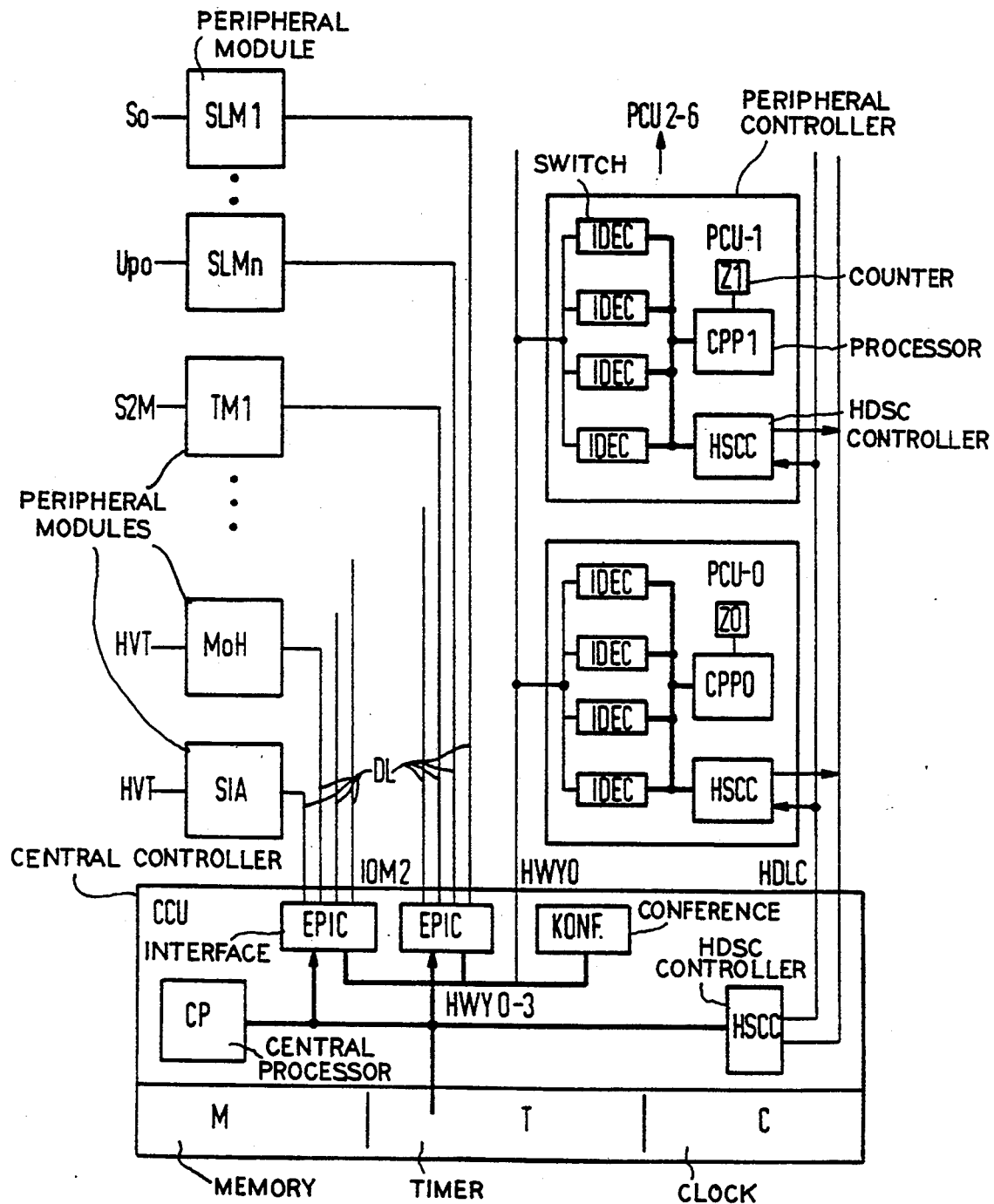

COMMUNICATIONS INSTALLATION

BACKGROUND OF THE INVENTION

The present invention relates to a communications installation having a central controller, a number of peripheral controllers and a multiplicity of peripheral modules.

In communications installations configured in this manner, the peripheral controllers handle tasks of layer 2 according to the so-called ISO layer model, that is to say they are responsible for identification and correction of transmission errors and signalling synchronization. At the same time, they control the control traffic to the central controller. In this arrangement, a fixed number of predetermined subscribers or exchange lines is allocated to each peripheral controller. This has the disadvantage that when peak loads occur in individual peripheral controllers, overloading can occur and, in consequence, the response times of these peripheral controllers become too long whilst other peripheral controllers are not used to capacity. This unequal usage of the peripheral controllers results from the fact that the respective number of peripheral controllers exclusively depends on the number of existing exchange circuits or connected subscribers and not on the actual traffic volume.

SUMMARY OF THE INVENTION

It is the object of the present invention to specify a communications installation of the abovementioned type in which overloading of individual peripheral controllers is avoided.

According to the invention, this object is achieved by a communications installation of the type initially mentioned,
in which all peripheral modules are connected to the central controller via separate data lines,
both information data and signalling data being transmitted via these data lines,
in which the information data is separated from the signalling data within the central controller,
in which the signalling data is supplied to the peripheral controllers via a separate data highway.
each peripheral controller exhibiting a software counter specifying the respective usage factor, and
the signalling data being diverted to other peripheral controllers in the event of high usage of one peripheral controller.

In the communications installation according to the invention, one or more peripheral controllers are activated in dependence on the respective traffic volume so that overloading of an individual peripheral controller is impossible. In addition, the communications installation according to the present invention has the advantage that only little prior effort has to be made in the initial setting-up of the installation since only the number of peripheral controllers needed in accordance with the maximum traffic volume to be expected must be provided. In a later upgrading of the installation or in a later extension for data traffic and packet switching, further peripheral controllers can then be installed.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single Figure is a block diagram of a communication installation according to the present invention

DESCRIPTION OF THE PREFERRED EMBODIMENT

The communications installation shown in the single Figure has the central controller CCU, the peripheral controllers PCU—0 to, for example PCU 6—and peripheral modules SLM1 to SLMn, TM1, MoH and SIA. The peripheral modules SLM1 to SLMn are subscriber circuits and the modules TM(x) are line circuits. The subscriber circuits are used for implementing, for example, analog and digital subscriber interfaces. The respective module contains the corresponding circuits for detecting the respective terminal states and a device for injecting the ringing tone. The number of line circuits TM(x) in each case depends on the configuration level of the installation.

Furthermore, a circuit for charge metering SIA and a "music-on-hold" module MoH, by means of which music or announcements can be played to waiting subscribers, can be provided as a peripheral module.

The central controller CCU essentially has a central processor CP, a memory unit M, a timer device T and a clock generating circuit C. The individual units of the central controller CCU are connected to one another via the PCM data transmission lines HWY0 . . . HWY3.

The individual peripheral controllers CPU0 . . . CPU6, which are connected to the central controller CCU for exchanging messages via the PCM data transmission line HWY0 and an HDLC transmission link, essentially have a peripheral processor CCP(x), an HDSC controller HSCC, a software counter Z(x) and a number of switching devices IDEC.

In the text which follows, the operation of the communications installation according to the invention will be described.

In the communications installation according to the present invention, each peripheral module is connected to the central controller CCU via a data line DL. According to the invention, only protective chips and telecommunication chips of layer I according to the "ISO layer model" are accommodated on the peripheral modules. These modules, for example the So, Upo and S2M interfaces can be constructed without processors which provides the possibility of accommodating more units than previously on one circuit board. The multi-layer boards frequently necessary in the case of processor modules can also be omitted in this case which leads to considerable cost savings. A standardized serial IOM Rev.2 interface IOM2 is used as interface to the central controller CCU. All signalling, information and packet data are transmitted via the data lines DL.

The signalling and packet data of a PCM data transmission line HWY0, to which the peripheral controllers CCP(x) are connected, are supplied via the interface controllers EPIC in the central controller CCU. These peripheral controllers handle the task of layer-2 chips in accordance with the so-called "ISO layer model".

Each peripheral controller has a software counter Z(x) (e.g. Z0 or Z1) which indicates the usage factor of this controller. In the case of high usage, D-channel information items from subscribers which want to set up telephone traffic or data traffic can then be diverted to other peripheral controllers which have a low usage factor.

This has the advantage that in systems having little telephone and data traffic, only a few peripheral controllers need to be used and, on the other hand, a theoretically arbitrary number of peripheral controllers can be connected in parallel in installations with high information processing. The maximum number of peripheral controllers is only set by the flat-in locations. The necessary work can thus be divided up particularly advantageously in the communications installation according to the invention. Due to the faster response times, it is also possible to reduce the size of the buffer memories.

No hardware switching is required since all "layer-2 chips" can access any time slot of the PCM frame. The time slots are switched through via the interface controllers EPIC within the central controller. This central task is thus handled by the central software and this part of the control traffic to the peripheral controllers is omitted.

An interrupt which initiates a routine in which the general tasks of the operating system are processed is generated by a timer T every 10 ms. The remaining time is available for processing the hardware requests, processing the control traffic and for "layer-1" and "layer-2" routines. When this work has been executed, the processor waits for the arrival of the next interrupt in an idle cycle. A counter can be inserted here which represents a measure of the usage of the processor integrated over a period $X \times 10$ ms.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be intepreted as illustrative and not in a limiting sense.

What is claimed is:

1. A communications installation comprising:
a central controller, a number of peripheral controllers and a multiplicity of peripheral modules;
a plurality of data lines for carrying information data and signalling data, and a data highway that is separated from the plurality of data lines, the data highway connecting the central controller to the peripheral controllers;
all peripheral modules being connected to the central controller via respective separate data lines of the plurality of data lines, the information data and signalling data both being transmitted via these data lines to the central controller;
means for separating the information data from the signalling data within the central controller;
means for supplying the separated signalling data to the peripheral controllers via the data highway, each peripheral controller having a software counter specifying a respective usage factor; and
in the central controller, means for diverting the separated signalling data to other peripheral controllers in the event of high usage of one peripheral controller.

2. A communication installation, comprising:
a plurality of peripheral controllers for handling traffic in the communication installation;
a central controller for controlling the peripheral controllers of the plurality of peripheral controllers;
a plurality of peripheral modules;
a plurality of data lines respectively connecting peripheral modules of the plurality of peripheral modules to the central controller;
a data highway connecting the peripheral controllers to the central controller;
information data and signalling data, each of which being supplied from respective peripheral modules of the plurality of peripheral modules via respective data lines of the plurality of data lines to the central controller;
means for separating the information data from the signalling data in the central controller;
means for supplying the separated signalling data to peripheral controllers of the plurality of peripheral controllers via the data highway, each of the peripheral controllers having a software counter specifying a respective usage factor; and
means for diverting in the central controller the separated signal data from a respective peripheral controller to other peripheral controllers in the event of high usage of the respective peripheral controller.

3. A communication installation, comprising:
a plurality of peripheral controllers for handling traffic in the communication installation;
a central controller for controlling the peripheral controllers of the plurality of peripheral controllers;
a plurality of peripheral modules;
a plurality of data lines respectively connecting peripheral modules of the plurality of peripheral modules to the central controller;
a data highway connecting the peripheral controllers to the central controller;
information data and signalling data, each of which being supplied from respective peripheral modules of the plurality of peripheral modules via respective data lines of the plurality of data lines to the central controller;
means for separating the information data from the signalling data in the central controller;
means for supplying the separated signalling data to peripheral controllers of the plurality of peripheral controllers via the data highway, each of the peripheral controllers having means for determining a high usage of a respective peripheral controller; and
means for diverting in the central controller the separated signal data from a peripheral controller having a high usage to other peripheral controllers.

* * * * *